Jan. 15, 1946.　　　M. D. BASOLO　　　2,392,804
METHOD OF MAKING MOLDED DRILL JIGS
Filed Oct. 13, 1941　　　2 Sheets-Sheet 1
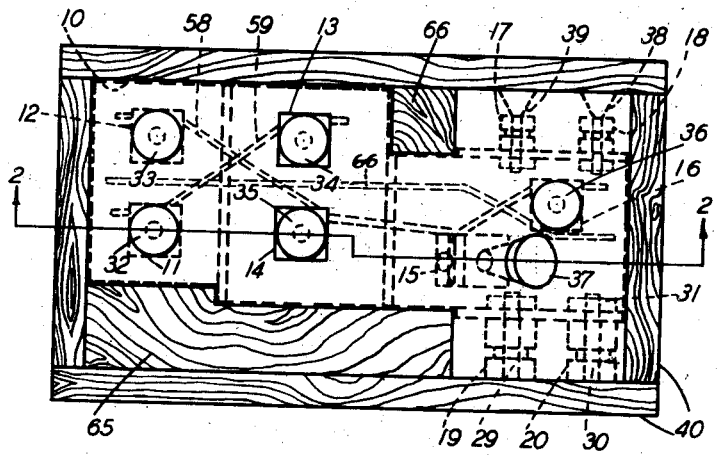
FIG—1
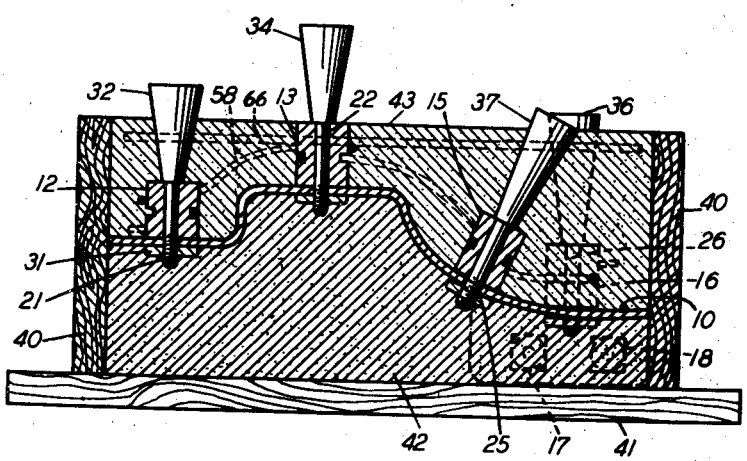
FIG—2
INVENTOR
MENOTO D. BASOLO
BY *George C. Sullivan*

Jan. 15, 1946.　　　M. D. BASOLO　　　2,392,804
METHOD OF MAKING MOLDED DRILL JIGS
Filed Oct. 13, 1941　　　2 Sheets-Sheet 2
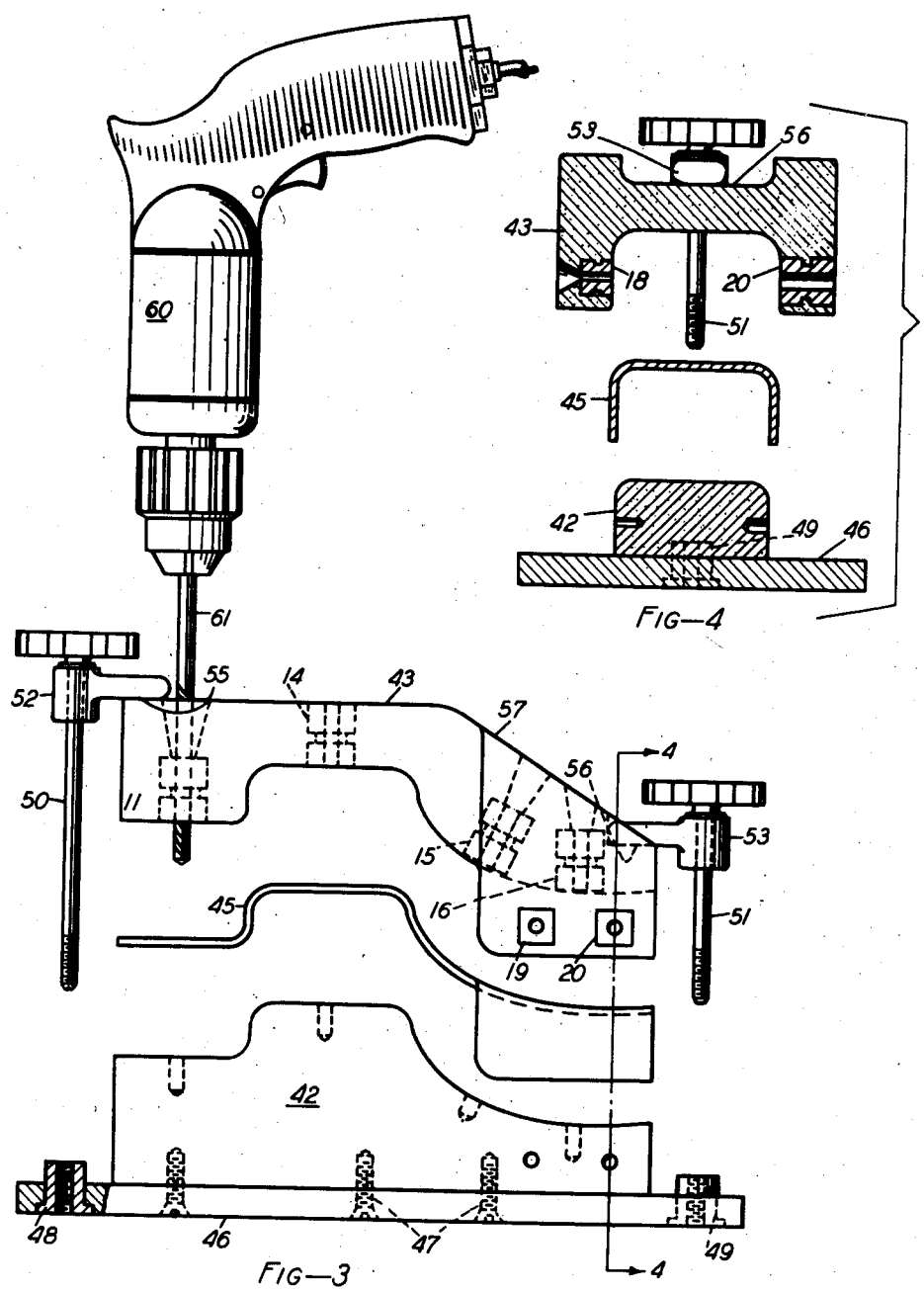
INVENTOR
MENOTO D. BASOLO
BY George C. Sullivan Patented Jan. 15, 1946

2,392,804

UNITED STATES PATENT OFFICE 2,392,804

METHOD OF MAKING MOLDED DRILL JIGS

Menoto D. Basolo, Burbank, Calif., assignor to Lockheed Aircraft Corporation, Burbank, Calif.

Application October 13, 1941, Serial No. 414,719

11 Claims. (Cl. 18—59)

This invention relates to machining and drilling fixtures in general and particularly to a method of making molded drill jigs.

This invention finds its most specific application to the rapid construction of drill jigs to be employed for drilling bolt and rivet holes in the quantity production of the numerous metal parts and components of complicated form and contour which must be interchangeably employed in the fabrication of airplane assemblies.

Heretofore, in the art of drilling various objects having complicated shapes and where a high degree of accuracy and complete interchangeability of such drilled parts is desired, it has been the practice to construct forms commonly known as drill jigs which snugly and accurately fit the contours of the object to be drilled and which carry drill guides or bushings which guide the drills in the correct angular direction and to the precise point upon the said object at which holes are to be drilled. Heretofore such drill jigs have been largely constructed of wood or other similar readily workable solid material in which the drill guides were inserted and fixed at the desired positions. This method of construction necessitated the most painstaking and time consuming trial and error hand shaping operations before the required fit between the jig surfaces and the surface contour of the object to be drilled could be attained. Such hand made jigs, for obvious reasons often lacked a high degree of accuracy and permanence in their dimensions.

It is an object of this invention to eliminate the before mentioned difficulties and disadvantages heretofore associated with the construction and use of drill fixtures and jigs in general and to provide a method of jig construction which will be both rapid and extremely accurate. It is a further object of this invention to provide a method of constructing a drill jig which will have an extremely accurate fit and close conformity to the surface contours of the parts to be drilled, particularly parts of complicated and irregular shape and varying surface curvature. It is a further object of this invention to provide a method of forming drill jigs by means of which objects can be drilled to close tolerances resulting in their perfect interchangeability.

The invention resides broadly in molding the drill jig at least in part in direct contact with the surface of a master duplicate of the parts to be drilled and including in the thus molded jig the drill guides or bushings at the required positions. The invention in its more specific aspect resides in the construction of a drill jig by forming a master pattern of the parts to be drilled, said master being an exact duplicate of the desired finished parts as to size, shape and location of holes to be drilled, fastening the drill bushings to the master part upon and in coaxial alignment with the holes therein to be drilled, placing the thus prepared master part in a suitable container whereby the master part serves as a portion of a mold thereby formed, and pouring or otherwise placing a suitable cement, plastic, or molten metal into the mold and upon the surface of the master part, allowing the material thus placed into the mold to be formed and to solidify in direct contact with the surface of the master part and around the drill bushings and then removing the jig part containing the included drill bushings from the mold and from the master part and subsequently employing the thus formed molded part as a guide for drilling operations.

Other advantages, objects and features of novelty will be evident hereinafter.

In the drawings, which by way of illustration show a preferred embodiment of the method and apparatus of the invention—

Figure 1 is a plan view of typical apparatus for molding the drill jig;

Figure 2 is a sectional elevation of the apparatus taken on line 2—2 of Figure 1;

Figure 3 is an exploded view in elevation of the assembly and general arrangement of the apparatus as applied to a typical part to be drilled; and Figure 4 is a cross-sectional view taken on line 4—4 of Figure 3.

In the drawings in which similar reference numerals refer to similar parts and referring primarily to Figures 1 and 2, 10 is a master part of irregular shape and contour which may be of sheet metal or other suitable material and which, with respect to shape, dimensions and location of holes, is an exact duplicate of the parts to be subsequently drilled. Drill guides or drill bushings 11 to 20 are shown attached to the master part by means of special bolts 21 to 30 which pass snugly through the bores of the bushings and the corresponding holes in the master part. The bolts 21 to 30 are held in place through the bushings and the master part by means of suitable nuts as shown at 31. The upper ends of the bolts 21 to 30 are provided with elongated conical shaped heads as shown at 32 to 39 which are adapted to bear upon the tops of the drill bushings and to extend upward therefrom through the mold. The various drill bushings may be tied together by means of suitable reinforcing wire or rods as shown at 58 and 59. The wire may be applied in a continuous length by making a single turn around each bushing and spot or tack welding it in place as shown. A box constructed of wood or other suitable material having sides 40 and a supporting base 41 serves to support the master part in an intermediate position for receiving, in the manner hereinafter described, the application of the body of molding material, the upper levels of which are shown at 42 and 43.

Referring now particularly to Figures 3 and 4, the upper and lower halves 43 and 42 respectively of the finished molded portions of the drill jig body carrying the imbedded drill bushings 11 to 20 are shown in separated and superimposed position or in a so called exploded arrangement ready for closing upon an intermediately positioned part 45 to be drilled.

The lower molded half 42 of the jig is attached to a suitable base plate 46, which may be any suitable material such as steel, wood, or preferably Masonite, by means of screws as shown at 47. The base plate is provided at its ends with threaded inserts 48 and 49 which are adapted to receive the threaded ends of hand clamping screws 50 and 51 which pass through suitable clips 52 and 53 which in turn are adapted to bear as shown at 55 and 56 upon the top surface of the upper half 43 of the molded jig body. A typical power driven hand drill is shown at 60 by way of illustration with a drill 61 shown extending in drilling position through one of the several drill bushings.

The method and operation of the invention is as follows:

A master part 10 is first formed which is an exact duplicate of the parts to be subsequently drilled in the jig as to size, shape and locations of holes. Drill guides or bushings having the proper internal bore diameters to accommodate the various drill sizes to be employed are next bolted to their corresponding positions upon the master part as shown at 11 to 20 by means of the specially shaped bolts as shown at 21 to 30, said bolts being threaded at one end to receive suitable nuts as shown at 31 and having conically shaped heads as shown at 32 to 39. The shanks of the bolts intermediate the threads and conical head are smooth and having diameters adapted to fit snugly the bores of the drill bushings and the corresponding holes in the master part in order to accurately center the said drill bushing upon the axis of the hole. Following this the master part carrying the attached drill bushings is suspended in the molding box 40 in the position shown in Figure 2 and the liquid, plastic or molten molding material is then poured on to the master part and around the drill bushing filling the box up to the top or to some convenient level such as indicated at 43 to form the upper half of the molded jig body. The molding material may be prevented from flowing down and escaping around the edges of the irregular shaped master part by constructing the box to a reasonably tight fit around the part and by employing auxiliary dams such as wooden blocks 65 and 66 to fit and close the openings adjacent the part irregularities.

After the molding material thus placed upon the upper face of the master part has been allowed to stand for a time sufficient for it to set-up or to solidify, the nuts are removed and the bolts 21 to 30 are withdrawn from the master part and from the casting thus formed, leaving the drill bushings securely embedded therein and the tapered openings corresponding in shape with the conical heads 32—39 leading through from the surface of the molding to the bores of the drill bushings.

The mold box 40 containing the master part, and also if desired either with or without the upper half of the molded jig body remaining in place, is next inverted upon the base plate 41 from the position shown in Figure 2 exposing the opposite side of the master part as the bottom of a second mold in which the lower portion of the jig body is to be molded. To prevent the molding material from flowing into the master part holes and through the drill bushings, the drill holes from which the before mentioned drill bushing bolts have been removed are closed or plugged by suitable means such as by placing small squares of cellulose scotch tape over the openings or by forcing wooden plugs into them or by filling them with clay or putty. Following this the liquid or plastic molding material is again poured upon the master part filling the mold box up to the top or to a convenient level such as shown at 42.

After solidification of this second portion of the molded apparatus, the mold box is disassembled and the upper and lower molded parts 43 and 42 are split off of the master part resulting in the production of a pair of molded forms between which the parts of the same shape and dimensions as the master may each be firmly nested.

For convenience in subsequent handling and use, the lower half of the molded jig 42 is attached by suitable screws 47 to a base plate 46 carrying threaded inserts 48 and 49.

The upper half of the jig 43 may then be firmly and rapidly clamped to the lower half by means of a pair of hand screws 50 and 51 adapted to make threaded connection with said insert and which carry rotatable clips 52 and 53 adapted to bear upon the upper surface 43 of the upper molded part. The upper and lower halves of the molded drill jig 43 and 42 may thus be rapidly and tightly clamped together upon an intermediately positioned part such as shown at 45 to be drilled. Figure 3 best shows the relative positions and arrangement of the drill jig components and the part to be drilled just prior to closing and clamping. After clamping the drills may be rapidly thrust through the drill bushing openings in the jig as shown at 60—61 and through the contained part to be drilled.

The upper molded half of the jig is shown with an end corner portion removed to the line 57 for the purpose of reducing weight and to increase the accessibility of the drill bushings 15 and 16. In most cases the types of molding materials employed will permit the trimming and removal of certain portions of the molded parts of the jig as desired by means of a band saw or by any of the other common types of saws or cuttings tools.

Materials which may be employed in the before described method for forming the molded jig parts are the various cements, preferably quick setting cements such as plaster of Paris and plaster-cal; plastics such as the cellulose and casein plastics and the phenol-formaldehyde, urea, acrylic, vinyl styrine and alkyd resins. Certain of the phenol-formaldehyde resin molding compounds containing suitable plasticizers and which are cold setting with only slight shrinkage are preferable for this purpose. Additionally various low melting temperature metal alloys such as Wood's metal may be employed.

It has been found desirable to employ various additives and fillers with the various molding compounds especially with the resins to increase their volume and their toughness and resistance to shock. Such materials are wood or Masonite flour, cotton waste and linters, hemp fibres, silica sand, diatomaceous earth and the like materials. These may be added in a quantity of from fifteen percent (15%) to twenty-five percent (25%) by volume.

For convenience the term plastic material has been employed herein as including within its meaning any one of the several before mentioned molding materials.

The drill bushings may be of any suitable metal but preferably of case hardened steel or tempered tool steel to reduce wear in use and they should be of irregular shape such as shown in the accompanying drawings to assure a permanent firm bond in the mold. When employing the various resins or molding compounds the drill bushings should preferably be coated with an acid resistant paint or varnish prior to the application of the plastic in order to prevent chemical reaction between the acid ingredients of the plastic and the metal which may result in destruction of the bond between the bushings and plastic.

Reinforcing wire may be employed through the molded body as shown at 58 and 59 in Figures 1 and 2 to tie the bushings together and to stiffen the molded part. The use of reinforcing wire in this manner is particularly desirable in molded jig parts which have a large area as compared to thickness or where portions thereof are necessarily thin. In addition to wire, other forms of reinforcing metal such as wire screening and expanded metal may be employed in the mold.

This invention is not only applicable to the construction of drill jigs suitable for drilling parts fabricated from sheet material, as illustrated herein, but it is also equally applicable to the construction of jigs for the drilling of parts formed by casting or forging methods. Such parts to be drilled may obviously be composed of substantially any desired material, the most commonly used ones in the aircraft industry being aluminum and its alloys and magnesium and its alloys. Brass, steels and also various plastics and resins may also be drilled in this type of jig.

The method of this invention is not only applicable to the construction of drill jigs but is similarly applicable to the formation of fixtures for guiding saws, router and milling cutters, spot facers, reamers and countersink cutters and the like cutting tools.

This method is also applicable to the formation of form blocks for use in the hydropress and punches and dies for use in drop-hammers.

As a specific example of the use of this invention in connection with sawing operations, an oversized part similar to that illustrated herein at 45 may be securely clamped between the bodies 42 and 43 and the excess material extending outward beyond the edges of the fixture may be trimmed off flush with the exterior of the fixture as a guide.

The foregoing is merely illustrative of the method or process and apparatus of the invention and is not intended to be limiting. The invention includes any method and apparatus which accomplish the same results within the scope of the claims.

I claim:

1. In a method of forming a drill jig the combination of steps comprising forming a master duplicate of the drilled part, attaching a drill bushing to said master forming a body of plastic material in contact with a surface of said master and surrounding a portion of said drill bushing, forming an opening extending through said plastic body from said bushing, causing said body to solidify forming thereby a solid body retaining said bushing in said opening and releasing and removing the bushing and said solidified body from said master.

2. In a method of forming a drill jig the combination of steps comprising forming a master duplicate of the drilled part, attaching drill bushings to said master in coaxial alignment with the drilled holes therein, forming a body of plastic material in contact with a surface of said master and surrounding said bushings, forming openings extending through said plastic body from said bushings, causing said body to solidify forming thereby a solid body including said bushings and said openings and releasing and removing said bushings and said solidified body from said master.

3. In a method of forming a drill jig the combination of steps comprising forming a master duplicate of the drilled part, attaching drill bushings to said master in coaxial alignment with the drilled holes therein, forming a body of plastic material in contact with a surface of said master and surrounding said bushings, forming openings extending through said plastic body from said busings, causing said body to solidify forming thereby a solid body including said bushings and conforming in shape with the surface of contact with the said master and said openings and releasing and removing said bushings and said solidified body from said master.

4. In a method of forming a drill jig the combination of steps comprising forming a master duplicate of the drilled part, attaching drill bushings to said master in coaxial alignment with the drilled holes therein, forming a body of plastic material in contact with a surface of said master and surrounding said bushings, forming openings extending through said plastic body from said bushings causing said body to solidify in contact with said surface of said master forming thereby a solid body including said bushings and said openings and conforming in shape with the surface of contact with the said master and releasing and removing said bushings and said solidified body from said master.

5. In a method of forming a drill jig the combination of steps comprising forming a master duplicate of the drilled part, attaching drill bushings to said master in coaxial alignment with the drilled holes therein, forming a body of plastic material containing reinforcing material in contact with a surface of said master and surrounding said bushings, forming openings extending through said plastic body from said bushings, causing said body to solidify in contact with said surface of said master forming thereby a rigid solid body including said bushings, and said openings, and said reinforcing material and conforming in shape with the surface of contact with the said master and releasing and removing said bushings and said solidified body from said master.

6. A method as in claim 5 with placing of a metal reinforcing structure in said plastic prior to solidification.

7. In a method of forming a drill jig the combination of steps comprising forming a master duplicate of the drilled part, attaching drill bushings to said master in coaxial alignment with the drilled holes therein, joining said drill bushings together by interconnecting reinforcing rods, forming a body of plastic material in contact with a surface of said master and surrounding said bushings and said interconnecting rods, causing said body to solidify in contact with said surface of said master forming thereby a solid body including said bushings and rods and conforming in shape with the surface of contact with the said master and releasing and removing said bushings and said solidified body from said master.

8. In a method of forming a drill jig the combination of steps comprising forming a master duplicate of the drilled part, attaching drill bushings to said master in coaxial alignment with the drilled holes therein, forming a first body of plastic material in contact with one surface of said master and surrounding said bushings, forming a second body of plastic material in contact with an opposite surface of said master, causing said plastic bodies to solidify in contact with said opposite surfaces of said master forming thereby a pair of solid bodies containing said bushings and said master part, and detaching said bushings and removing said bodies from said master and obtaining thereby a pair of mating solid forms adapted to nest together in close conformity around duplicate parts to be drilled.

9. In a method of forming a drill jig the combination of steps comprising forming a master duplicate of the drilled part, attaching drill bushings to said master in coaxial alignment with the drilled holes therein, joining said drill bushings together by interconnecting reinforcing rods, forming a first body of plastic material in contact with one surface of said master and surrounding said bushings and said rods, forming a second body of plastic material in contact with an opposite surface of said master, causing said plastic bodies to solidify in contact with said opposite surfaces of said master forming thereby a pair of solid bodies containing said bushings and said master part, and detaching said bushings and removing said bodies from said master and obtaining thereby a pair of mating solid forms adapted to nest together in close conformity around duplicate parts to be drilled.

10. In a method of forming a drill jig the combination of steps comprising forming a master duplicate of the drilled part, attaching drill bushings to said master in coaxial alignment with the drilled holes therein, joining said drill bushings together by interconnecting reinforcing rods, forming a first body of plastic material in contact with one surface of said master and surrounding said bushings and said rods, forming a second body of plastic material in contact with an opposite surface of said master, including reinforcing rods in said second body of plastic, causing said plastic bodies to solidify in contact with said opposite surfaces of said master and around said reinforcing rods forming thereby a pair of solid bodies containing said bushings and said master part, and detaching said bushings and removing said bodies from said master and obtaining thereby a pair of reinforced mating solid forms adapted to nest together in close conformity around duplicate parts to be drilled.

11. In a method for forming a drill jig, the combination of steps comprising, forming a master duplicate of the drilled parts, attaching drill bushings to said master, interconnecting said bushings by means of a plastic body and joining said drill bushings together by interconnecting reinforcing rods placed in said plastic.

MENOTO D. BASOLO.